US007010043B2

(12) United States Patent
Kerofsky et al.

(10) Patent No.: US 7,010,043 B2
(45) Date of Patent: Mar. 7, 2006

(54) RESOLUTION SCALABLE VIDEO CODER FOR LOW LATENCY

(75) Inventors: Louis J. Kerofsky, Portland, OR (US); Xin Li, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 652 days.

(21) Appl. No.: 10/127,742

(22) Filed: Apr. 22, 2002

(65) Prior Publication Data

US 2003/0007562 A1    Jan. 9, 2003

Related U.S. Application Data

(60) Provisional application No. 60/303,193, filed on Jul. 5, 2001.

(51) Int. Cl.
   H04N 7/18   (2006.01)
(52) U.S. Cl. .............................. 375/240.19; 375/240.27
(58) Field of Classification Search ........... 375/240.27, 375/240.12, 240.2, 240.16, 240.19; 348/388.1, 348/399.1, 410.1; 370/469
   See application file for complete search history.

(56) References Cited

U.S. PATENT DOCUMENTS

| | | | |
|---|---|---|---|
| 5,270,813 A | 12/1993 | Puri et al. .................... 358/136 |
| 5,818,531 A * | 10/1998 | Yamaguchi et al. ...... 375/240.2 |
| 5,988,863 A | 11/1999 | Demos ................... 364/715.02 |
| 6,043,846 A | 3/2000 | Shen et al. .................. 348/409 |
| 6,072,831 A * | 6/2000 | Chen ...................... 375/240.03 |
| 6,148,005 A * | 11/2000 | Paul et al. .................... 370/469 |
| 6,148,030 A * | 11/2000 | Katata et al. ............. 375/240.1 |
| 6,229,850 B1 | 5/2001 | Linzer et al. ........... 375/240.11 |
| 6,392,705 B1 * | 5/2002 | Chaddha ................... 348/388.1 |
| 6,480,541 B1 * | 11/2002 | Girod et al. ............ 375/240.12 |
| 6,510,177 B1 * | 1/2003 | De Bonet et al. ........ 375/240.16 |
| 6,700,933 B1 * | 3/2004 | Wu et al. ............... 375/240.16 |
| 6,728,775 B1 * | 4/2004 | Chaddha ..................... 709/231 |
| 6,816,194 B1 * | 11/2004 | Zhang et al. ........... 375/240.27 |

OTHER PUBLICATIONS

"High Performance Resolution Scalable Video Coding Via All-Phase Motion Compensated Prediction of Wavelet Coefficients," Xin Li and Louis Kerofsky, SPIE vol. 4671, Oct. 2001, pp. 1080-1090.

* cited by examiner

Primary Examiner—Andy Rao
(74) Attorney, Agent, or Firm—Madson & Metcalf

(57) ABSTRACT

A method in a scalable encoder for reducing the average latency associated with randomly accessing an encoded digital video signal is disclosed. This method may include converting a digital video signal into a first layer having a first degree of quality and a second layer having a second degree of quality that is higher than the first degree of quality. The method may also include encoding the first layer at a first intra-frame rate, and encoding the second layer at a second intra-frame rate that is lower than the first intra-frame rate. A method in a scalable decoder for reducing the average latency associated with randomly accessing an encoded digital video signal is also provided. The method includes accessing a first layer of a digital video signal. The first layer includes the digital video signal encoded at a first degree of quality and a first intra-frame rate. The method also includes accessing a second layer of the digital video signal. The second layer includes the digital video signal encoded at a second degree of quality higher than the first degree of quality and a second intra-frame rate lower than the first intra-frame rate.

24 Claims, 13 Drawing Sheets

RESOLUTION SCALABLE VIDEO CODER FOR LOW LATENCY

RELATED APPLICATIONS

This application is related to and claims priority from U.S. patent application Ser. No. 60/303,193 filed Jul. 5, 2001, for "Resolution scalable video coding for low latency," with inventors Louis Joseph Kerofsky and Xin Li, which is incorporated herein by reference.

TECHNICAL FIELD

This invention relates generally to digital video, and is more particularly directed toward methods and apparatus for reducing the average latency associated with randomly accessing an encoded digital video signal.

BACKGROUND

A video signal is typically made up of a number of frames, where each frame represents an image. The individual frames are displayed at a high enough rate that provides a moving image to appear to a viewer. A digital video signal is a video signal in digital form. A digital video signal may be created using a digital video source, such as a digital camera. Alternatively, an analog video signal may be converted to digital form through the use of a frame grabber or other similar device.

Large amounts of data may be used in a digital video signal to produce a video for a viewer. Typically higher quality digital videos require more data than lower quality videos. In addition, the longer the digital video sequence, the more data must be transmitted.

Compression schemes, such as MPEG-2, MPEG-4, H.263+, and the like, are often used to reduce the amount of data used to represent digital video signals. Compression reduces transmission costs, and where a fixed transmission capacity is available, results in a better quality of multimedia presentation. As an example, a 6-MHz analog cable TV channel can carry between four and ten digitized, compressed channels, thereby increasing the overall capacity (in terms of the number of programs carried) of an existing cable television plant. Alternatively, a 6-MHz broadcast television channel can carry a digitized, compressed High-Definition Television (HDTV) signal to give a significantly better audio and picture quality without requiring additional bandwidth.

Compression involves eliminating redundancy present in the frames of a digital video signal. There are two different types of redundancy, spatial and temporal. Spatial redundancy refers to redundant information within a single frame. Temporal redundancy refers to redundant information between different frames. Intra frames, or I-frames, eliminate only spatial redundancy, and are encoded independently of other frames. Predictive frames, or P-frames, eliminate both spatial and temporal redundancy, and are encoded with respect to immediately previous I- or P-frames. A group of pictures (GOP) consists of an I frame and any number of P frames that successively follow the I frame. The higher the GOP value, the more P frames there are that successively follow a single I frame.

Transmitting I frames requires more bandwidth than transmitting P frames. Therefore, to reduce the bandwidth required to transmit a digital video signal, it is advantageous to encode a digital video signal using a high GOP value. A decoder, however, cannot begin decoding an encoded bitstream at a P frame. If a decoder randomly accesses an encoded digital video signal having a high GOP value, there is a relatively high likelihood that the decoder will first access a P frame. In such case, the decoder waits until it receives an I frame before it may begin the process of decoding. Benefits may be realized by methods and apparatus that may, on average, reduce this latency associated with randomly accessing an encoded digital video signal.

SUMMARY OF THE INVENTION

A method in a scalable encoder for reducing the average latency associated with randomly accessing an encoded digital video signal is disclosed. This method may include converting a digital video signal into a first layer having a first degree of quality and a second layer having a second degree of quality that is higher than the first degree of quality. The method may also include encoding the first layer at a first intra-frame rate, and encoding the second layer at a second intra-frame rate that is lower than the first intra-frame rate. The degrees of quality may include spatial resolution, signal-to-noise ratio, or any other characteristic that affects how the digital video signal is perceived after it is decoded.

Converting the digital video signal into first and second layers may be performed according to a video compression/decompression standard such as MPEG-2, MPEG-4, and H.263+. Alternatively, this step may involve the use of wavelet transforms. In such an embodiment, the first layer may include frequency components of the digital video signal below a first frequency, and the second layer may include frequency components of the digital video signal below a second frequency that is higher than the first frequency.

A method in a scalable decoder for reducing the average latency associated with randomly accessing an encoded digital video signal is also provided. The method includes accessing a first layer of a digital video signal. The first layer includes the digital video signal encoded at a first degree of quality and a first intra-frame rate. The first layer also includes a first layer current frame. The method also includes accessing a second layer of the digital video signal. The second layer includes the digital video signal encoded at a second degree of quality higher than the first degree of quality and a second intra-frame rate lower than the first intra-frame rate. The second layer also includes a second layer current frame.

In one embodiment, the method also includes decoding the first layer current frame if the first layer current frame is an intra frame or a first layer previous frame has been decoded. The method may also include decoding the second layer current frame if the first layer current frame was decoded and if the second layer current frame is an intra frame or a second layer previous frame has been decoded.

A scalable encoder configured to reduce the average latency associated with randomly accessing an encoded digital video signal is also disclosed. The scalable encoder may include a scaling unit configured to convert a digital video signal into a first layer having a first degree of quality and a second layer having a second degree of quality, a first layer encoder configured to encode the first layer at a first intra-frame rate, and a second layer encoder configured to encode the second layer at a second intra-frame rate that is lower than the first intra-frame rate.

A scalable decoder configured to reduce the average latency associated with randomly accessing an encoded digital video signal is also disclosed. The scalable decoder includes a first layer decoder configured to access a first layer of a digital video signal. The first layer includes the digital video signal encoded at a first degree of quality and a first intra-frame rate. The first layer also includes a first layer current frame. The scalable decoder also includes a second layer decoder configured to access a second layer of the digital video signal. The second layer includes the digital video signal encoded at a second degree of quality higher than the first degree of quality and a second intra-frame rate lower than the first intra-frame rate. The second layer also includes a second layer current frame.

In one embodiment, the first layer decoder is configured to decode the first layer current frame if the first layer current frame is an intra frame or a first layer previous frame has been decoded. In such an embodiment, the second layer decoder may be configured to decode the second layer current frame if the first layer current frame was decoded and if the second layer current frame is an intra frame or a second layer previous frame has been decoded.

BRIEF DESCRIPTION OF THE DRAWINGS

The present embodiments will become more fully apparent from the following description and appended claims, taken in conjunction with the accompanying drawings. Understanding that these drawings depict only typical embodiments and are, therefore, not to be considered limiting of the invention's scope, the embodiments will be described with additional specificity and detail through use of the accompanying drawings in which:

DETAILED DESCRIPTION

It will be readily understood that the components of the embodiments as generally described and illustrated in the Figures herein could be arranged and designed in a wide variety of different configurations. Thus, the following more detailed description of the embodiments of the methods and apparatus of the present invention, as represented in the Figures, is not intended to limit the scope of the invention, as claimed, but is merely representative of the embodiments of the invention.

Figure 1:
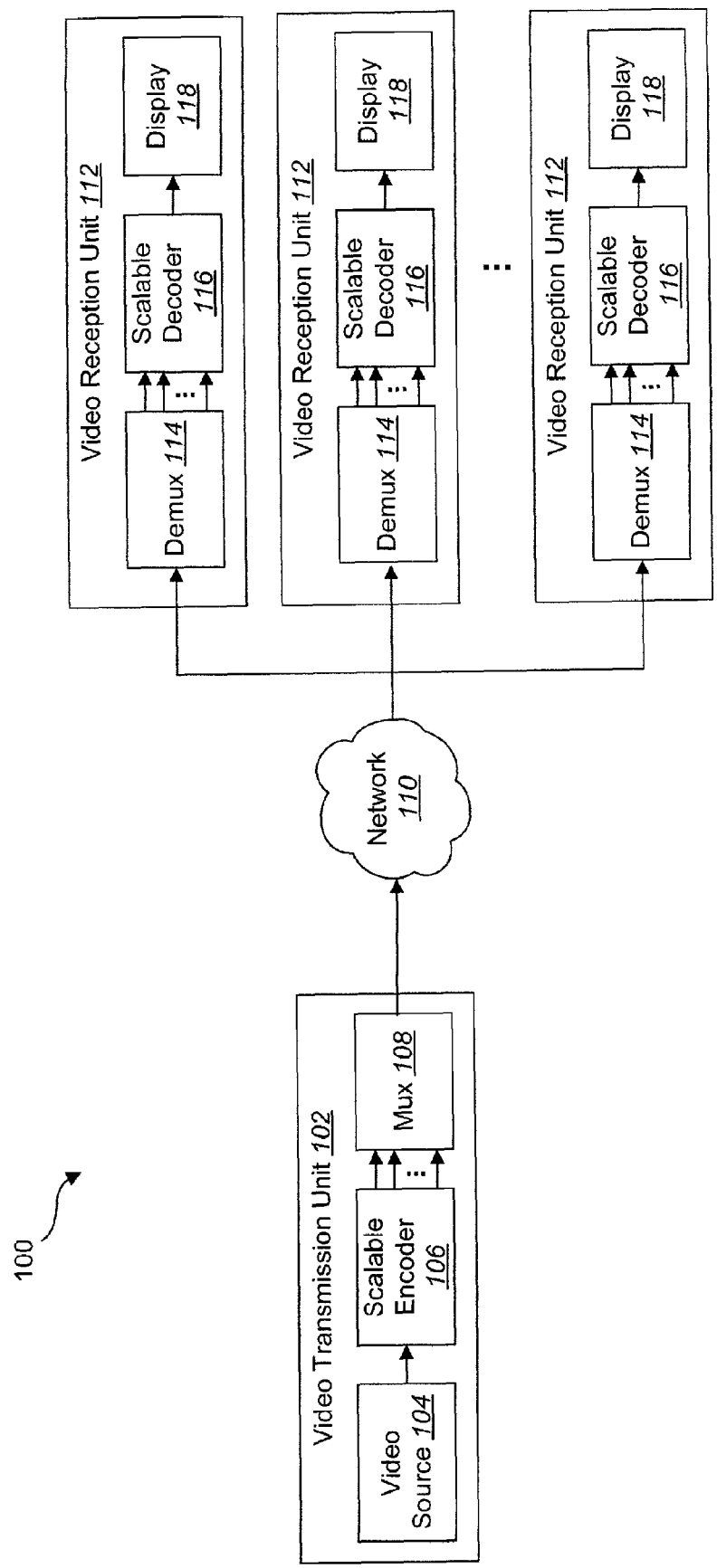
FIG. 1 is a block diagram of a digital video distribution system.

FIG. 1 is a block diagram of an embodiment of a digital video distribution system 100. The system 100 includes a video transmission unit (VTU) 102. A VTU 102 refers to any combination of hardware and/or software components that make encoded digital video signals available to one or more video decoders. Examples of a VTU 102 include, but are not limited to, a cable television head-end, a direct broadcast satellite head-end, a web server, and the like.

The VTU 102 includes a video source 104, a scalable encoder 106, and a multiplexer (mux) 108. The video source 104 provides the digital video signal that is to be encoded by the scalable encoder 106. The video source 104 may take the form of a video camera, a magnetic storage medium (e.g., disk drive), optical storage medium (e.g., CD-ROM), and the like.

The digital video signal provided by the video source 104 is input to the scalable encoder 106. The scalable encoder 106 encodes the digital video signal frame by frame at varying degrees of quality. As used herein, a "degree of quality" refers to any characteristic that affects how the digital video signal is perceived after it is decoded. One example of a degree of quality is spatial resolution. For example, the scalable encoder 106 may encode the digital video signal provided by the video source 104 at multiple spatial resolutions (e.g., 640 by 480 pixels, 800 by 600 pixels, etc.). Another example of a degree of quality is signal-to-noise ratio (SNR).

A digital video signal encoded at a particular degree of quality will be referred to herein as a "layer" of the digital video signal. A higher layer of a digital video signal is encoded at a higher degree of quality than a lower layer. The number of layers in any particular embodiment illustrated herein is exemplary only. For example, although the scalable encoder 106 in FIG. 1 encodes the digital video signal provided by the video source 104 into three layers, the digital video signal may in fact be encoded into any number of layers.

The mux 108 merges the plurality of layers into a single multiplexed bitstream which is transported over a network 110 to a plurality of video reception units (VRUs) 112. The network 110 may be a local area network, wide area network, the Internet, and the like. The VRUs 112 may include set-top boxes, personal computers, and the like.

Each VRU 112 includes a demultiplexer (demux) 114, a scalable decoder 116, and a display unit 118. The demux 108 separates the single multiplexed bitstream into the plurality of layers created by the scalable encoder 106. These layers are then input into the scalable decoder 116.

Although multiple VRUs 112 are shown in FIG. 1, only one VRU 112 may be provided in accordance with the embodiments disclosed herein. That is, instead of a point-to-multipoint connection between a single VTU 102 and multiple VRUs 112 as shown in FIG. 1, there may only be a point-to-point connection between a single VTU 102 and a single VRU 112.

The scalable encoder 106 and the scalable decoder 116 may be implemented using a variety of techniques. For example, digital video compression standards such as MPEG-2, MPEG-4, and H.263+ support scalable encoding/decoding techniques that may be used to create the scalable encoder 106 and/or the scalable decoder 116. In addition, other techniques may also be used to accomplish scalable encoding and decoding. For example, wavelet transforms may be used to accomplish scalable encoding and decoding. A specific technique involving the use of wavelet transforms will be described in greater detail below.

The scalable decoder 116 may not be able to immediately decode each of the layers. This is because the scalable decoder 116 may initially access one or more of the layers at a P-frame, and, as explained previously, a decoder cannot begin decoding at a P-frame. The highest layer that the scalable decoder 116 is capable of decoding at any given time is typically decoded and displayed on the display unit 118.

Figure 2:
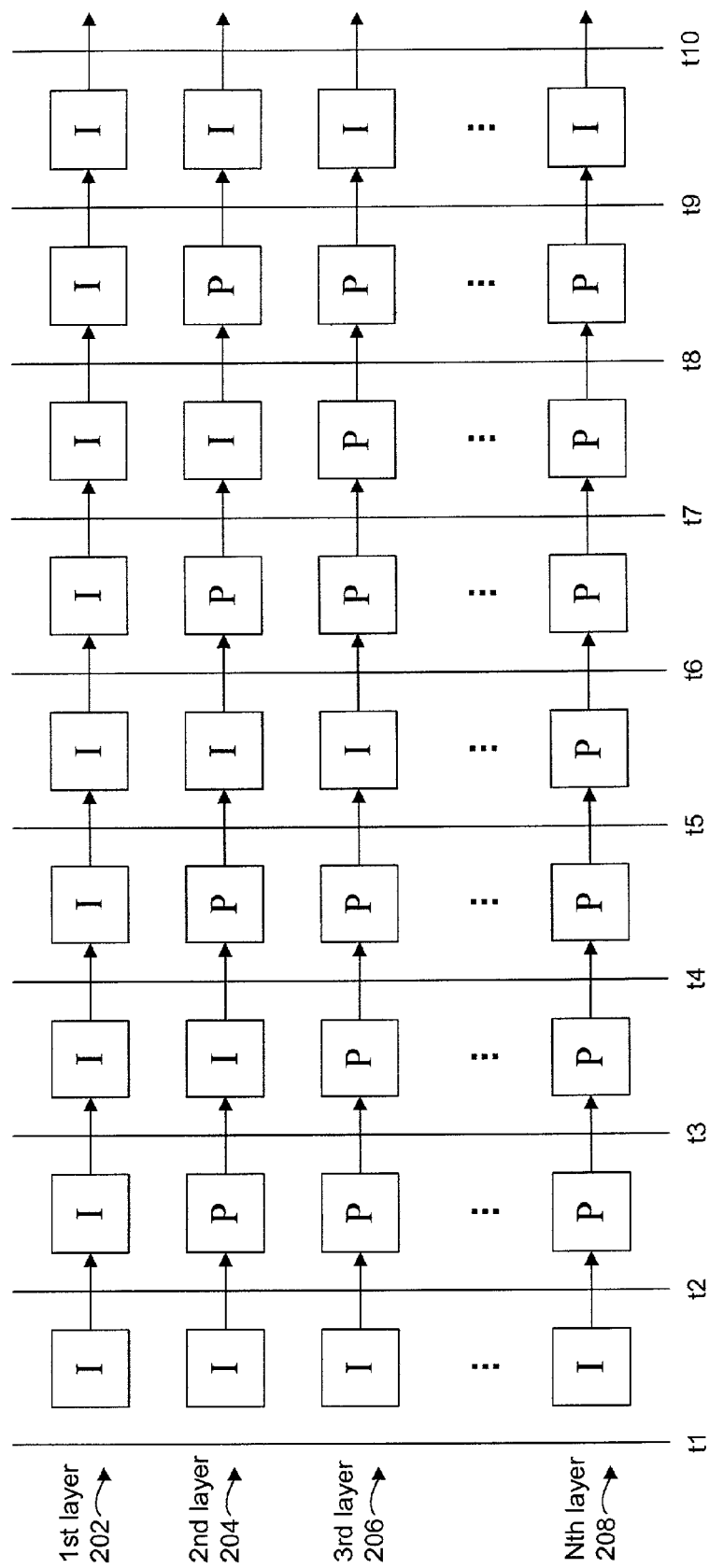
FIG. 2 is a timing diagram illustrating successively encoded frames within a plurality of layers generated by a scalable encoder.

FIG. 2 is a timing diagram illustrating successively encoded frames within a plurality of layers generated by the scalable encoder 106. N layers—a 1st layer 202, a 2nd layer 204, a 3rd layer 206, and an Nth layer 208—are shown in FIG. 2. Successively encoded frames within a particular layer are shown moving from left to right in a horizontal direction. The vertical lines represent distinct moments in time, i.e., t2 occurs after time t1, time t3 occurs after time t2, and so on. The presence of the Nth layer 208 reiterates that any number of layers may be provided in accordance with the embodiments disclosed herein.

As stated previously, a higher layer of a digital video signal is encoded at a higher degree of quality than a lower layer. For example, the 2nd layer 204 is encoded at a higher degree of quality than the 1st layer 202, the 3rd layer 206 is encoded at a higher degree of quality than the 2nd layer 204, and so forth. Also, as mentioned previously, a degree of quality may refer to spatial resolution, SNR, or any other characteristic that affects how the digital video signal is perceived after it is decoded.

The scalable encoder 106 encodes successive layers at a decreasing I-frame rate. The I-frame rate is a measure of the frequency of occurrence of I frames within the layer. For example, the I-frame rate of the 1st layer 202 is 1, because each frame is an I frame. The I-frame rate of the 2nd layer 204 is ½, because every other frame is an I frame. The I-frame rate of the 3rd layer 206 is ¼, because every fourth frame is an I frame. Finally, the I-frame rate of the Nth layer 208 is ⅑, because every ninth frame is an I frame.

The scalable encoder 106 encodes the first frame within each layer as an I frame. However, the scalable decoder 116 does not necessarily access each layer at this first I frame. For example, a television viewer may tune into a digital television broadcast at some point after it starts.

Suppose, for example, that the scalable decoder 116 accesses the layers shown in FIG. 2 at time t2. An example of this context would be when a person watching television from a digital television signal changes the channel at time t2. At time t2, the current frame in the Nth layer 208 is a P frame, the current frame in the 3rd layer 206 is a P frame, and the current frame in the 2nd layer 204 is a P frame. As a result, the scalable decoder 116 is unable to display these layers. However, the current frame in the 1st layer 202 is an I frame. Thus, the scalable decoder 116 decodes the 1st layer 202 and displays it on the display unit 118.

In the foregoing example, only the 1st layer 202 includes an I frame at time t2. Although this I frame is of a lower quality than an I frame in a higher-numbered layer, by accessing and displaying the I frame in the 1st layer, a viewer will be shown the first frame of the video sooner than if the decoder 116 waited for the next I frame in the Nth layer. Then, and as will be 26 discussed more fully below, as I frames become available from higher layers, the decoder 116 may decode and display the higher quality layers.

At time t3, the current frame in the Nth layer 208 and the 3rd layer 206 is a P frame. Thus, the scalable decoder 116 cannot decode these layers. However, the current frame in both the 2nd layer 204 and the 1st layer 202 is an I frame. As stated previously, the highest layer that the scalable decoder 116 is capable of decoding at any given time is typically decoded and displayed on the display unit 118. Because the 2nd layer 204 represents the digital video signal at a higher degree of quality than the 1st layer 202, the scalable decoder 116 decodes the 2nd layer 204 and displays it on the display unit 118.

At time t4, the current frame in the Nth layer 208, the 3rd layer 206, and the 2nd layer 204 is a P frame. The scalable decoder 116 cannot decode the Nth layer 208 or the 3rd layer 206 because these layers have not included an I frame since the scalable decoder 116 began accessing them at time t2. However, even though the current frame in the 2nd layer 204 is a P frame, the scalable decoder 116 can decode the 2nd layer 204 because an I frame at this degree of quality has already been decoded (at time t3). Thus, the scalable decoder 116 decodes the 2nd layer 204 and displays it on the display unit 118.

At time t5, the current frame in the Nth layer 208 is a P frame. Thus, the scalable decoder 116 cannot decode this layer. However, the current frame in the 3rd layer 206, the 2nd layer 204, and the 1st layer 202 is an I frame. Because the 3rd layer 206 represents the digital video signal at a higher degree of quality than the 2nd layer 204 or the 1st layer 202, the scalable decoder 116 decodes the 3rd layer 206 and displays it on the display unit 118.

The scalable decoder 116 continues to decode and display the 3rd layer 206 until time t9. At time t9, the current frame in each layer is an I frame. Because the Nth layer 208 represents the digital video signal at the highest degree of quality, the scalable decoder 116 decodes the Nth layer 208 and displays it on the display unit 118. From time t9 forward, the scalable decoder 116 decodes and displays the Nth layer 208.

Of course, the particular I-frame rates shown in FIG. 2 are exemplary only. An encoded layer of a digital video signal may have any desired I-frame rate. However, in certain embodiments, it may be advantageous for the 1st layer 202 to have an I-frame rate of 1. This is so that the scalable decoder 116 will always be able to decode at least one of the layers.

Figure 3:
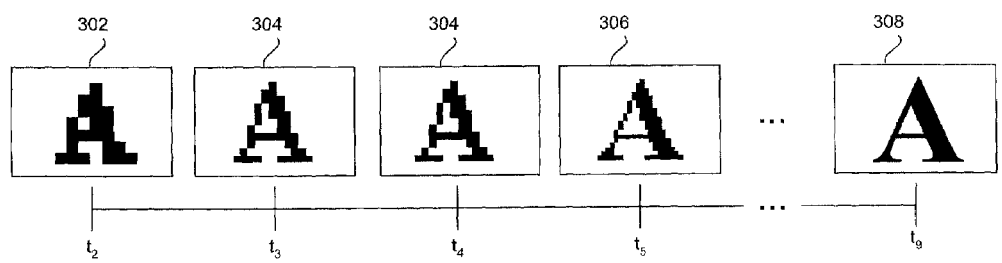
FIG. 3 is an illustration of decoded digital video over time on a display unit for the embodiment illustrated in FIG. 2 if the degree of quality is spatial resolution.

As stated previously, the scalable encoder 106 produces different layers of a digital video signal, the different layers being encoded at increasing degrees of quality. Also as explained previously, these layers are decoded by a scalable decoder 116 and displayed on a display unit 118. FIG. 3 is an illustration of how the decoded digital video signal changes over time on the display unit 118 if the degree of quality is spatial resolution. For purposes of example, the time references shown in FIG. 3 match those in FIG. 2 (i.e., time t2 in FIG. 3 corresponds to time t2 in FIG. 2).

At time t2, the scalable decoder 116 decodes the 1st layer 202 and displays it on the display unit 118. Because the degree of quality in the embodiment shown in FIG. 3 is spatial resolution, the 1st layer 202 is the digital video signal encoded at a 1st spatial resolution 302. When the decoded digital video signal is displayed on the display unit 118, it is displayed at this 1st spatial resolution 302.

Typically the embodiments herein are used with video that is displayed on television screens or computer monitors. As a result, the example of FIG. 3 shows the images/video displayed as the same size but with varying degrees of quality. Thus, in these examples the embodiments stretch the image to fit the size of the display area rather than display a smaller image. It will be appreciated, however, that embodiments may also display a smaller spatial resolution in a smaller space on the display rather than stretch the video to fit the screen.

At time t3, the scalable decoder decodes the 2nd layer 204 and displays it on the display unit 118. The 2nd layer 204 is the digital video signal encoded at a 2nd spatial resolution 304 that is higher than the 1st spatial resolution 302. The decoded digital video signal is then displayed on the display unit 118 at this 2nd spatial resolution 304. At time t4, the scalable decoder 116 continues to decode the 2nd layer 204, so the decoded digital video signal continues to be displayed on the display unit 118 at the 2nd spatial resolution 304.

At time t5, the scalable decoder 116 decodes the 3rd layer 206. The 3rd layer 206 is the digital video signal encoded at a 3rd spatial resolution 306 that is higher than either the 1st spatial resolution 302 or the 2nd spatial resolution 304. The decoded digital video signal is then displayed on the display unit 118 at this 3rd spatial resolution 306. The scalable decoder 116 continues to decode the 3rd layer 206, and the decoded digital video signal continues to be displayed on the display unit 118 at the 3rd spatial resolution 306, until time t9.

At time t9, the scalable decoder 116 begins to decode the Nth layer 208, which is the digital video signal encoded at an Nth spatial resolution 308 that is higher than either the 1st spatial resolution 302, 2nd spatial resolution 304, or 3rd spatial resolution 306. The decoded digital video signal is displayed on the display unit 118 at this Nth spatial resolution 308 from time t9 onward.

The embodiments disclosed herein may reduce the latency associated with randomly accessing an encoded digital video signal. For example, referring to the embodiment illustrated in FIGS. 2 and 3, without the lower layers (e.g., the 1st layer 202, 2nd layer 204, and 3rd layer 206), the scalable decoder 116 would not be able to begin the decoding process until time t9. With the lower layers, however, the scalable decoder 116 is able to begin the decoding process at time t2. This does not mean that the embodiments disclosed herein will reduce the latency associated with accessing an encoded digital video signal at all times. For example, if the scalable decoder 116 were to access the layers shown in FIG. 2 at time t9, the scalable decoder 116 would be able to decode the Nth layer 208 immediately, and would not need to use the lower layers. In general, however, the embodiments disclosed herein reduce the average latency associated with randomly accessing an encoded digital video signal.

As stated previously, the mux 108 merges the plurality of layers into a single multiplexed bitstream which is transported over a network 110 to a plurality of VRUs 112. Advantageously, the addition of the lower layers (i.e., the 1st layer 202, 2nd layer 204, and 3rd layer 206 in FIG. 2) does not substantially increase the bandwidth of the multiplexed bitstream. That is, the bandwidth of the single multiplexed bitstream is determined primarily by the highest layer (i.e., the Nth layer 208 in FIG. 2). Therefore, the embodiments disclosed herein may reduce the average latency involved in decoding an encoded digital video signal without significantly increasing the bandwidth required to transmit the signal.

Figure 4:
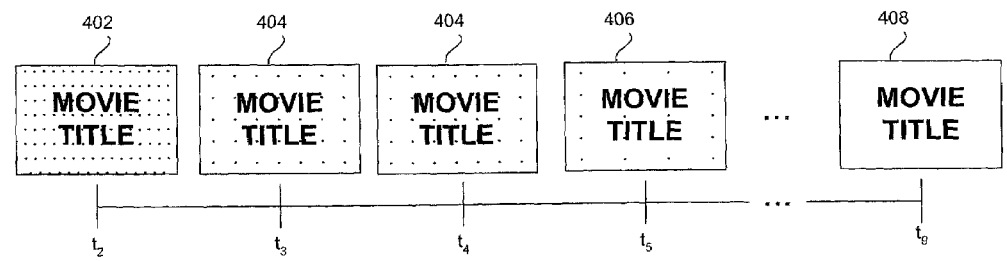
FIG. 4 is an illustration of decoded digital video over time on a display unit for the embodiment illustrated in FIG. 2 if the degree of quality is signal-to-noise ratio.

FIG. 4 is an illustration of how the decoded digital video signal changes over time on the display unit 118 if the degree of quality is SNR. The time references shown in FIG. 4 also match those in FIG. 2.

At time t2, the scalable decoder 116 decodes the 1st layer 202 and displays it on the display unit 118. Because the degree of quality in the embodiment shown in FIG. 4 is SNR, the 1st layer 202 is the digital video signal encoded at a 1st SNR 402. When the decoded digital video signal is displayed on the display unit 118, it is displayed at this 1st SNR 402.

At time t3, the scalable decoder decodes the 2nd layer 204 and displays it on the display unit 118. The 2nd layer is the digital video signal encoded at a 2nd SNR 404 that is higher than the 1st SNR 402. The decoded 2nd layer 204 is then displayed on the display unit 118 at this 2nd SNR 404. As may be seen from FIG. 4, the decoded 2nd layer 204 is clearer (i.e., there is less noise in the decoded 2nd layer 204) than the decoded 1st layer 202. At time t4, the scalable decoder 116 continues to decode the 2nd layer 204, so the decoded 2nd layer 204 continues to be displayed on the display unit 118 at the 2nd SNR 404.

At time t5, the scalable decoder 116 decodes the 3rd layer 206. The 3rd layer is the digital video signal encoded at a 3rd SNR 406 that is higher than either the 1st SNR 402 or the 2nd SNR 404. The decoded 3rd layer 206 is then displayed on the display unit 118 at this 3rd SNR 406. As may be seen from FIG. 4, the decoded 3rd layer 206 is clearer than either the decoded 2nd layer 204 or the decoded 1st layer 202. The scalable decoder 116 continues to decode the 3rd layer 206, and the decoded 3rd layer 206 continues to be displayed on the display unit 118 at the 3rd SNR 406, until time t9.

At time t9, the scalable decoder 116 begins to decode the Nth layer 208, which is the digital video signal encoded at an Nth SNR 408 that is higher than either the 1st SNR 402, 2nd SNR 404, or 3rd SNR 406. The decoded Nth layer 208 is displayed on the display unit 118 at this Nth SNR 408 from time t9 onward. As may be seen from FIG. 4, the decoded Nth layer 208 is clearer than either the decoded 3rd layer 206, the decoded 2nd layer 204 or the decoded 1st layer 202, with a virtually imperceptible amount of noise.

The differences between the spatial resolutions in FIG. 3 and the SNRs in FIG. 4 have been emphasized for purposes of illustration. In fact, the differences between decoded signals at various spatial resolutions, SNRs, and other degrees of quality may not be as pronounced.

Figure 5:
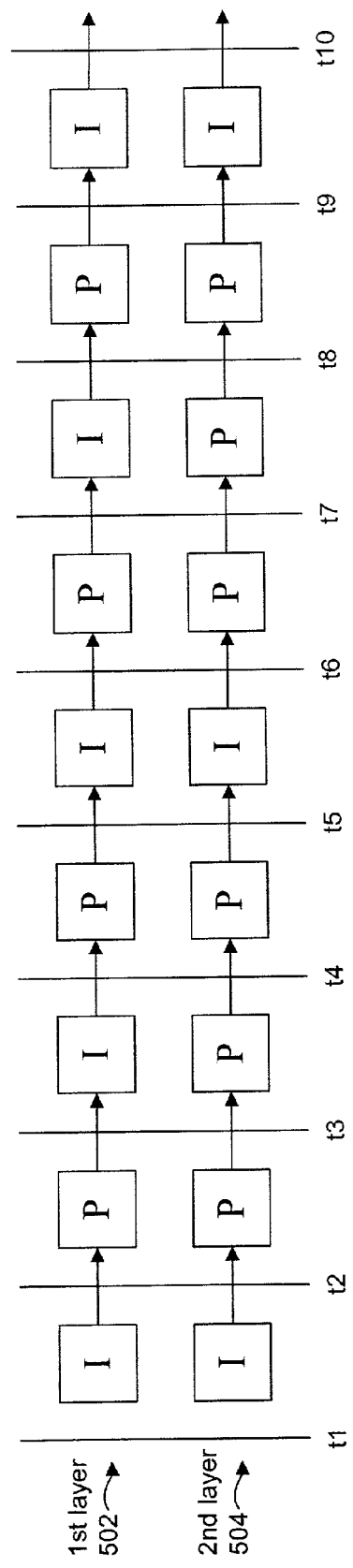
FIG. 5 is another timing diagram illustrating an alternative approach for successively encoded frames within a plurality of layers.

FIG. 5 is another timing diagram illustrating an alternative approach for successively encoding frames within a plurality of layers. Two layers 502 and 504 are shown in FIG. 5. The I-frame rate of the 1st layer 502 is ½, and the I-frame rate of the 2nd layer 504 is ⅓.

As in the previous example, suppose that the scalable decoder 116 accesses the layers shown in FIG. 5 at time t2. At time t2, the current frame in both the 1st layer 502 and the 2nd layer 504 is a P frame. Thus, the scalable decoder 116 cannot decode these layers, and the scalable decoder 116 simply waits until time t3.

At time t3, the current frame in the 2nd layer 504 is a P frame. Thus, the scalable decoder 116 cannot decode this layer. However, the current frame in the 1st layer 502 is an I frame. Therefore, the scalable decoder 116 decodes the 1st layer 502 and displays it on the display unit 118. The scalable decoder 116 continues to decode the 1st layer 502 until time t5.

At time t5, the current frame in the 2nd layer 504 is an I frame. Because the 2nd layer 504 represents the digital video signal at a higher degree of quality than the 1st layer 502, the scalable decoder 116 decodes the 2nd layer 504 and displays it on the display unit 118. The scalable decoder 116 continues to decode the 2nd layer 504 from time t5 forward.

Figure 6:
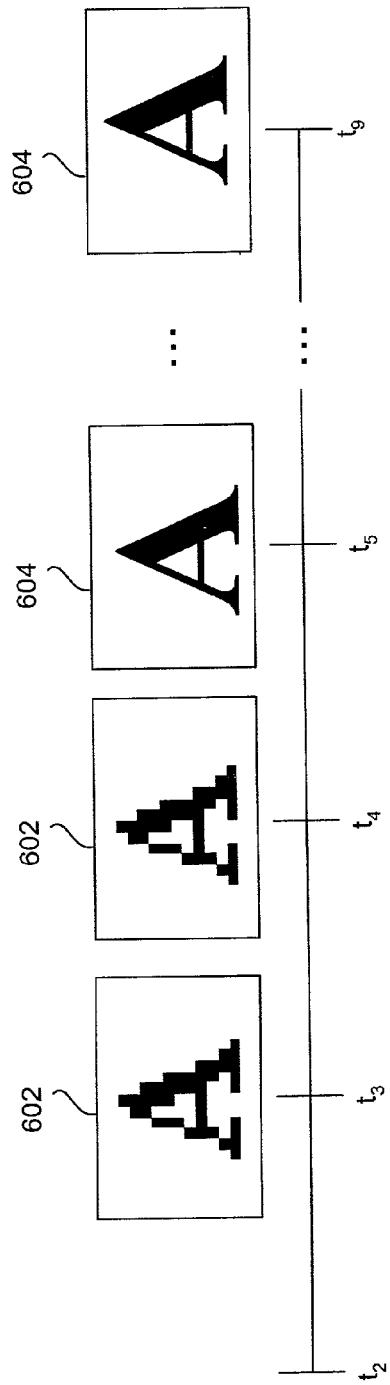
FIG. 6 is an illustration of decoded digital video over time on a display unit for the embodiment illustrated in FIG. 5 if the degree of quality is spatial resolution.

FIG. 6 is an illustration of how the decoded digital video signal changes over time on the display unit 118 for the embodiment of FIG. 5. The degree of quality illustrated is spatial resolution. The time references shown in FIG. 6 match those in FIG. 5.

At time t2, the scalable decoder 116 is unable to decode the 1st layer 502 or the 2nd layer 504. Therefore, nothing is displayed on the display unit 118.

At time t3, the scalable decoder decodes the 1st layer 502 and displays it on the display unit 118. The 1st layer is the digital video signal encoded at a 1st spatial resolution 602. The decoded digital video signal is then displayed on the display unit 118 at this 1st spatial resolution 602. The scalable decoder 116 continues to decode the 1st layer 502 until time t5. Therefore, the decoded digital video signal is displayed on the display unit 118 at the 1st spatial resolution 602 until time t5.

At time t5, the scalable decoder 116 begins to decode the 2nd layer 504, which is the digital video signal encoded at an 2nd spatial resolution 604 that is higher than the 1st spatial resolution 602. The decoded digital video signal is displayed on the display unit 118 at this 2nd spatial resolution 604 from time t5 onward.

In the embodiments shown in FIGS. 2–4, the scalable decoder 116 is always able to decode at least one of the layers. Therefore, a decoded digital video signal is always displayed on the display unit 118 at some degree of quality. In the embodiment shown in FIGS. 5–6, the scalable decoder 116 is not able to decode any of the layers at time t2. However, a decoded digital video signal is displayed on the display unit 118 at time t3. If only the 2nd layer 504 were available to the scalable decoder 116, nothing would be displayed until time t5.

Figure 7:
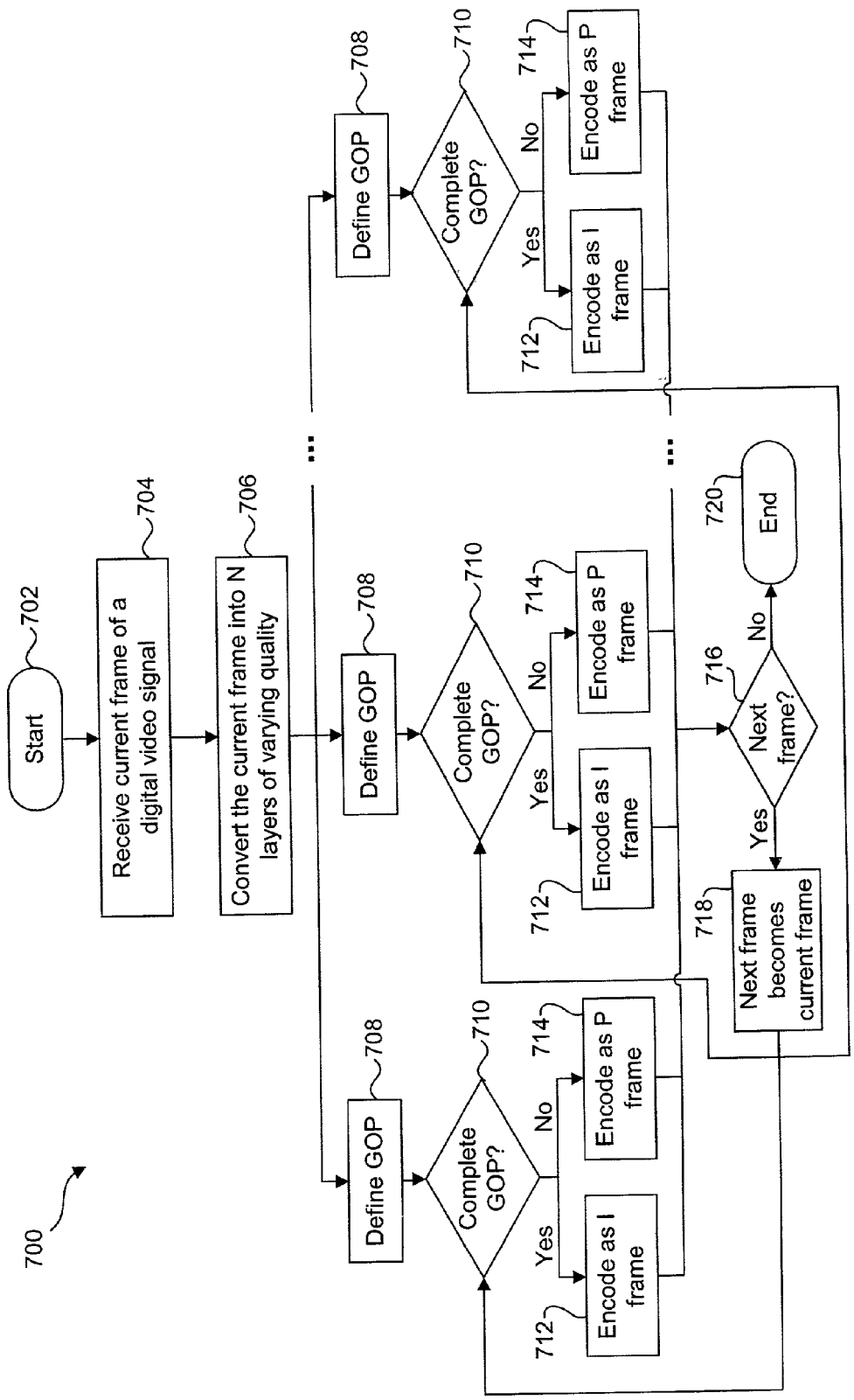
FIG. 7 is a flowchart showing a method for encoding layers of a digital video signal at varying intra-frame rates.

FIG. 7 is a flowchart showing a method 700 for encoding layers of a digital video signal at varying intra-frame rates. The method starts 702 when the scalable encoder 106 receives 704 the current frame of a digital video signal. The current frame is then converted 706 into N layers of varying degrees of quality, where N represents any integer greater than or equal to 2.

Steps 708 through 714 are performed for each of the N layers. In particular, a GOP is defined 708 for each layer. As noted previously, a GOP consists of an I frame and any number of P frames that successively follow the I frame. Thus, the GOP for each layer will vary directly with the degree of quality of the layer. In other words, the layer having the highest degree of quality will have the highest GOP, the layer having the next highest degree of quality will have the next highest GOP, and so forth. The scalable encoder 106 then determines 710 whether the previous frame completed a GOP. If so, the current frame is encoded 712 as an I frame. If not, the current frame is encoded 714 as a P frame.

The scalable encoder 106 then determines 716 whether there is a next frame. If so, then the next frame becomes 718 the current frame, and the method repeats beginning at step 710. If not, the method ends 720.

Figure 8:
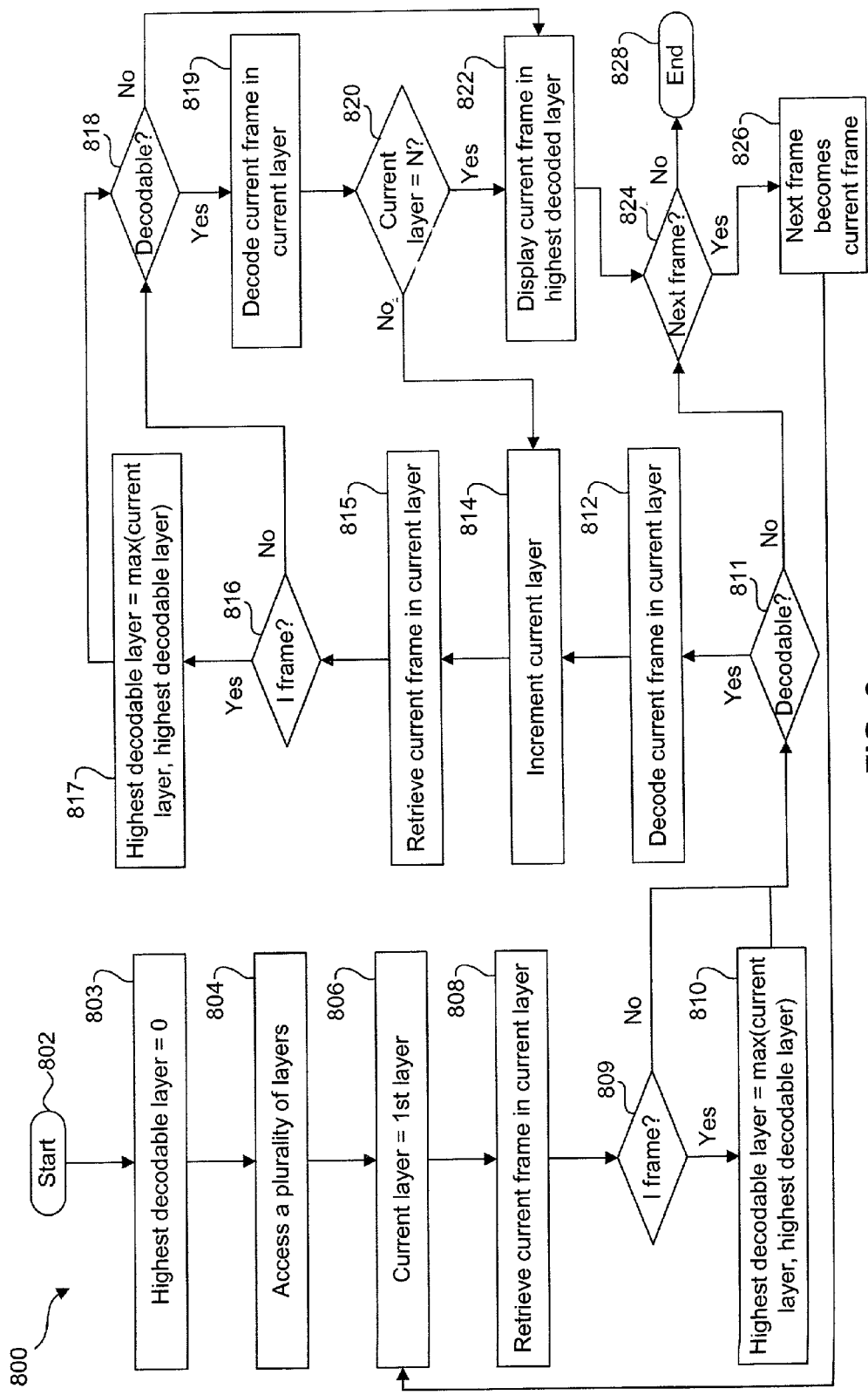
FIG. 8 is a flowchart illustrating a method for decoding layers of a digital video signal encoded at varying intra-frame rates.

FIG. 8 is a flow diagram illustrating a method 800 for decoding layers of a digital video signal encoded at varying intra-frame rates. The method 800 starts 802 by setting 803 the maximum decodable layer to zero and by accessing 804 a plurality of layers of a digital video signal. The first layer is then made 806 to be the current layer. The current frame in the current layer is then retrieved 808.

The method 800 may then involve determining 809 if the current layer of the current frame is an I-frame. When an I-frame is detected, the highest decodable layer may be modified 810. The method 800 may then involve determining 811 whether the current frame in the current layer is decodable. The current frame in the current layer is decodable if it is an I-frame or if an I-frame in the current layer has previously been decoded. If the current frame in the current layer is decodable, the current frame in the current layer is decoded 812.

The current layer may then be incremented 814. The method 800 may then retrieve 815 the current frame in the current layer. The method 800 may then involve determining 816 if the current layer of the current frame is an I-frame. When an I-frame is detected, the highest decodable layer may be modified 817. The method 800 may then involve determining 818 whether the current frame in the current layer is decodable. Once again, the current frame in the current layer is decodable if it is an I-frame or if an I-frame in the current layer has previously been decoded. If the current frame in the current layer is decodable, the current frame in the current layer is decoded 819.

The method 800 may then involve determining 820 whether the current layer is the Nth layer. If the current layer is not the Nth layer, the method 800 may return to step 814 and proceed as described above. If the current layer is the Nth layer, the method 800 may involve displaying 822 the current frame in the highest decoded layer. It may then be determined 824 whether there is a next frame. If there is a next frame, the next frame becomes 826 the current frame, and the method 800 returns to step 806 and proceeds as described above. If it is determined 824 that there is not a next frame, the method then ends 828.

If in step 810 it is determined 810 that the current frame in the current layer is not decodable, the method 800 may proceed directly to step 824. If in step 816 it is determined 810 that the current frame in the current layer is not decodable, the method 800 may proceed directly to step 822.

Figure 9:
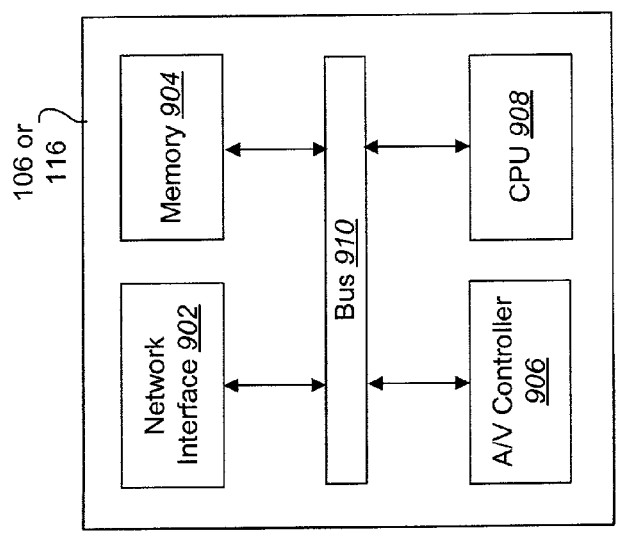
FIG. 9 is a block diagram illustrating the major hardware components that may be utilized in a scalable encoder and/or a scalable decoder.

FIG. 9 is a block diagram illustrating the major hardware components that may be utilized in a scalable encoder 106 and/or a scalable decoder 116. The scalable encoder 106 and/or scalable decoder 116 may include a network interface 902. The network interface 902 may include conventional circuitry for multiplexing and/or demultiplexing, modulating and/or demodulating, and transmitting and/or receiving a digital video signal.

The scalable encoder 106 and/or scalable decoder 116 may also include a memory 904. The memory 904 may include a random access memory (RAM) for storing temporary data. Alternatively, or in addition, the memory 904 may include a read-only memory (ROM) for storing more permanent data, such as fixed code and configuration data. The memory 904 may also be embodied as a magnetic storage device, such as a hard disk drive.

The scalable decoder 116 may also include an audio/video (A/V) controller 906 for converting decoded digital video signals into analog signals for playback/display on the display unit 118. The A/V controller 906 may be implemented using one or more physical devices, such as separate graphics and sound controllers. The A/V controller 906 may also include graphics hardware for performing bit-block transfers (bit-blits) and other graphical operations.

A CPU 908 is also provided to control the operation of the scalable encoder 106 and/or the scalable decoder 116, including the other components thereof, which are coupled to the CPU 908 via a bus 910. The CPU 908 may be embodied as a microprocessor, microcontroller, digital signal processor or other device known in the art. The CPU 908 performs logical and arithmetic operations based on program code stored within the memory 904. In certain embodiments, the memory 904 may be on-board memory included with the CPU 908. For example, microcontrollers often include a certain amount of on-board memory.

Of course, the block diagram of FIG. 9 is only meant to illustrate typical hardware components of a scalable encoder 106 and/or a scalable decoder 116, and is not meant to limit the scope of embodiments disclosed herein.

Figure 10:
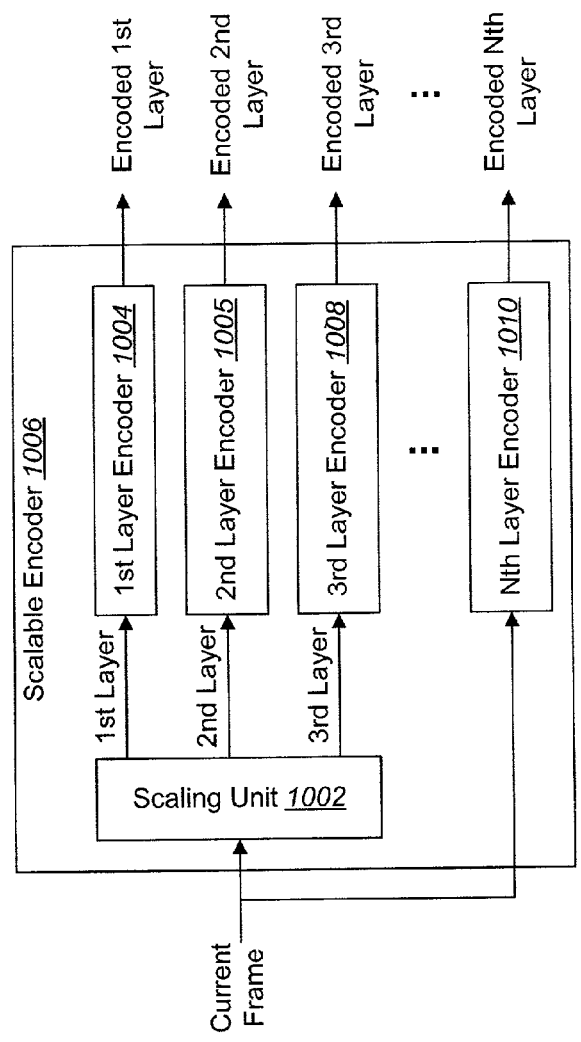
FIG. 10 shows a block diagram of logical components of a scalable encoder.

FIG. 10 is a block diagram of an embodiment of a scalable encoder 1006. The current frame of a digital video signal is input to a scaling unit 1002. The scaling unit 1002 converts the current frame into a plurality of layers of varying degrees of quality. In the embodiment shown in FIG. 10, the scaling unit 1002 converts the current frame into four layers: a 1st layer, a 2nd layer, a 3rd layer, and an Nth layer. The 1st layer is input to the 1st layer encoder 1004, the 2nd layer is input to the 2nd layer encoder 1005, and the 3rd layer is input to the 3rd layer encoder 1008. The current frame is input directly to an Nth layer encoder 1010.

Each layer encoder outputs an encoded current frame corresponding to the appropriate layer. Each layer encoder may also output additional information that may be used by the decoder to decode the layers. Examples of such additional information include one or more motion vectors and phase vectors used to predict a current frame based on a previous frame, as will be explained in greater detail below. When the next frame appears as input to the scaling unit 1002, the next frame becomes the current frame and the above process is repeated.

Figure 11:
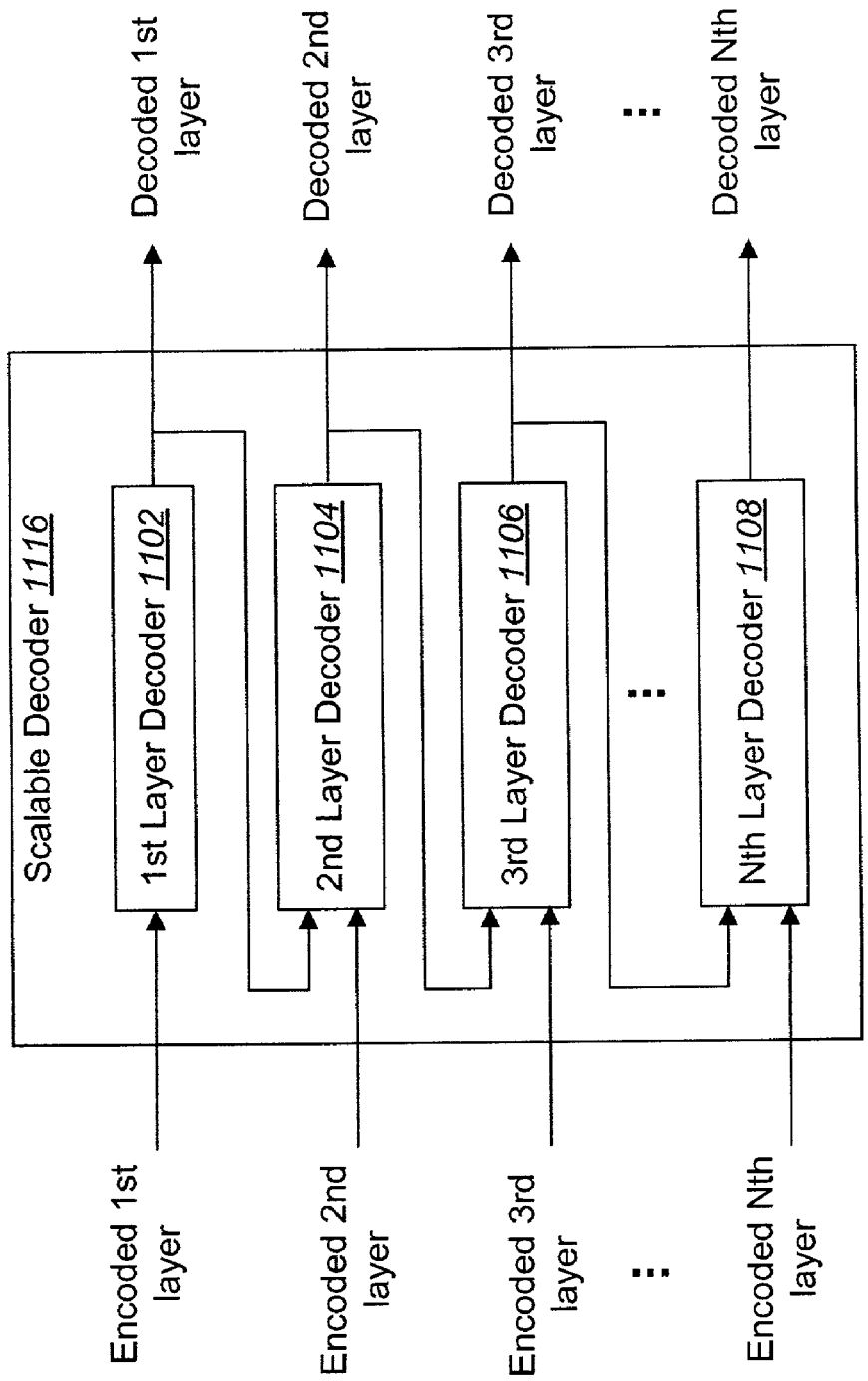
FIG. 11 shows a block diagram of logical components of a scalable decoder.

FIG. 11 is a block diagram of an embodiment of a scalable decoder 1116. The scalable decoder 1116 consists of a plurality of layer decoders. The 1st layer decoder 1102 receives an encoded current frame from the 1st layer and any additional information corresponding to that encoded frame (e.g., motion vectors and phase vectors). The 1st layer decoder 1102 outputs a decoded current frame from the 1st layer which may then be displayed on the display unit 118. The 2nd layer decoder 1104 receives an encoded current frame from the 2nd layer, any additional information corresponding to that frame, and the decoded current frame from the 1st layer. The decoded current frame from the 1st layer is used by the 2nd layer decoder 1104 to decode the encoded current frame from the 2nd layer. The 2nd layer decoder 1104 outputs a decoded current frame from the 2nd layer which may then be displayed on the display unit 118. The 3rd layer decoder 1206 and Nth layer decoder 1208 operate in a similar fashion to the 2nd layer decoder 1104.

The scalable encoder 1006 shown in FIG. 10 and the scalable decoder 1116 shown in FIG. 11 may be implemented using a variety of techniques. For example, digital video compression standards such as MPEG-2, MPEG-4, and H.263+ support scalable encoding/decoding techniques that may be used to create the scalable encoder 1006 and/or scalable decoder 1116. In FIGS. 13 through 17, one exemplary technique for implementing the scalable encoder 1006 and scalable decoder 1116 will be illustrated and explained in detail. However, the embodiments disclosed herein should not be construed as being limited to this specific technique.

Figure 12:
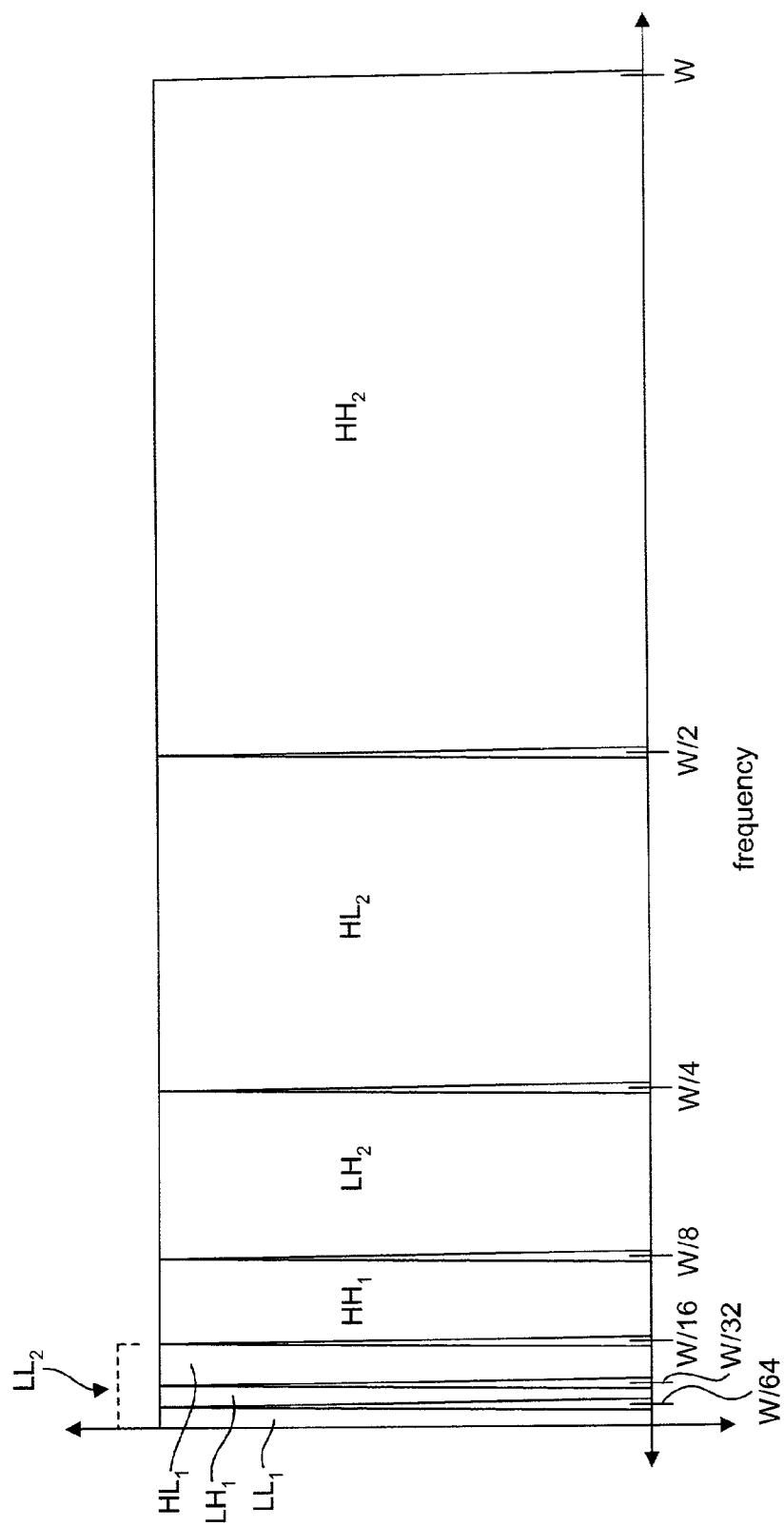
FIG. 12 shows the frequency spectrum of a current frame after being partitioned by a wavelet transform unit.

In one embodiment, the scaling unit 1002 may take the form of a wavelet transform unit (WTU) 1002. The WTU 1002 takes advantage of the principle that natural images tend to have a nonuniform frequency spectrum, with most of the energy concentrated in the lower frequency band. Thus, the WTU 1002 partitions the current frame into several frequency bands. FIG. 12 shows the frequency spectrum of a current frame having a bandwidth W. The current frame has been partitioned into seven frequency subbands. The lowest frequency subband has a bandwidth equal to W/64 (extending from 0 to W/64), the next highest subband has a bandwidth equal to W/32 (extending from W/64 to W/32), the next highest subband has a bandwidth equal to W/16 (extending from W/32 to W/16), and so forth, with each higher subband occupying a higher octave of the total bandwidth W. The lowest subband is labeled LL1, the next highest subband is labeled LH1, and so forth, as shown in FIG. 12. The meaning of these labels will be explained in greater detail below.

The subbands are created by passing the current frame through a series of bandpass filters. Because bandpass filters having infinitely sharp transition regions are not physically realizable, there is some overlap between the subbands.

Figure 13:
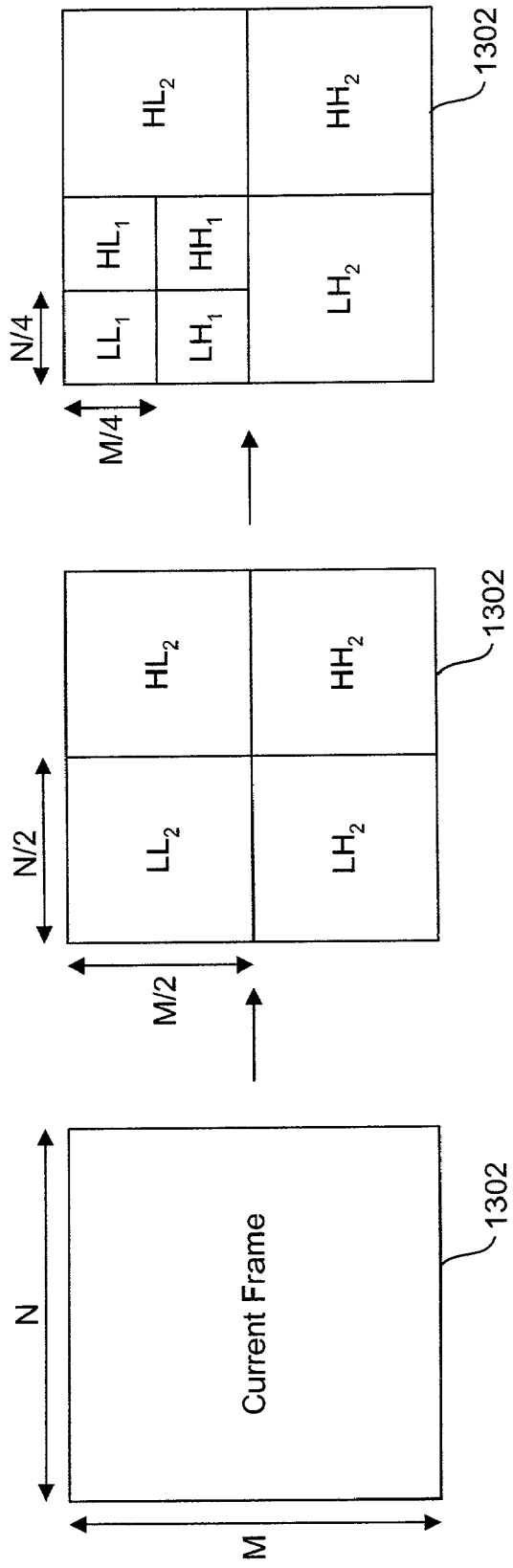
FIG. 13 illustrates the spatial resolution of a plurality of frequency subbands created by dear the wavelet transform unit.

Because the bandwidth of each subband is lower than the bandwidth of the current frame, the images may now be sampled at a lower rate than the current frame (according to the Nyquist criteria). Therefore, the subbands may possess a lower spatial resolution than the current frame. FIG. 13 illustrates the spatial resolution of the subbands relative to the current frame.

A current frame 1302 having a spatial resolution of m horizontal rows by n vertical columns (m×n) is shown. After the current frame 1302 is passed through one stage of the WTU 1002, four frequency subbands are created: LL2, LH2, HL2, and HH2. Referring briefly back to FIG. 12, the LL2 subband has a bandwidth of W/8 (extending from 0 to W/8), the LH2 subband has a bandwidth of W/8 (extending from W/8 to W/4), the HL2 subband has a bandwidth of W/4 (extending from W/4 to W/2), and the HH2 subband has a bandwidth of W/2 (extending from W/2 to W). Returning to FIG. 13, each subband LL2, LH2, HL2, and HH2 has a spatial resolution of m/2×n/2.

The LL2 subband is then passed through another stage of the WTU 1002. Thus, the LL2 subband is further broken down into four additional subbands: LL1, LH1, HL1, and HH1. Referring back to FIG. 12, the LL1 subband has a bandwidth of W/64 (extending from 0 to W/64), the LH1 subband has a bandwidth of W/64 (extending from W/64 to W/32), the HL1 subband has a bandwidth of W/32 (extending from W/32 to W/16), and the HH1 subband has a bandwidth of W/16 (extending from W/16 to W/8). Returning to FIG. 13, each subband LL1, LH1, HL1, and HH1 has a spatial resolution of m/4×n/4.

As stated previously, the WTU 1002 may be used to implement the scaling unit 1002 shown in FIG. 11. In such an embodiment, the 1st layer output by the WTU 1002 corresponds to the LL1 subband. The LL1 subband has the lowest spatial resolution. Most of the energy from the current frame is concentrated in the LL1 subband, so the image represented by the current frame is likely perceptible in the LL1 subband. The 2nd layer output by the WTU 1002 corresponds to the LL2 subband. The LL2 subband has a spatial resolution higher than the LL1 subband.

Figure 14:
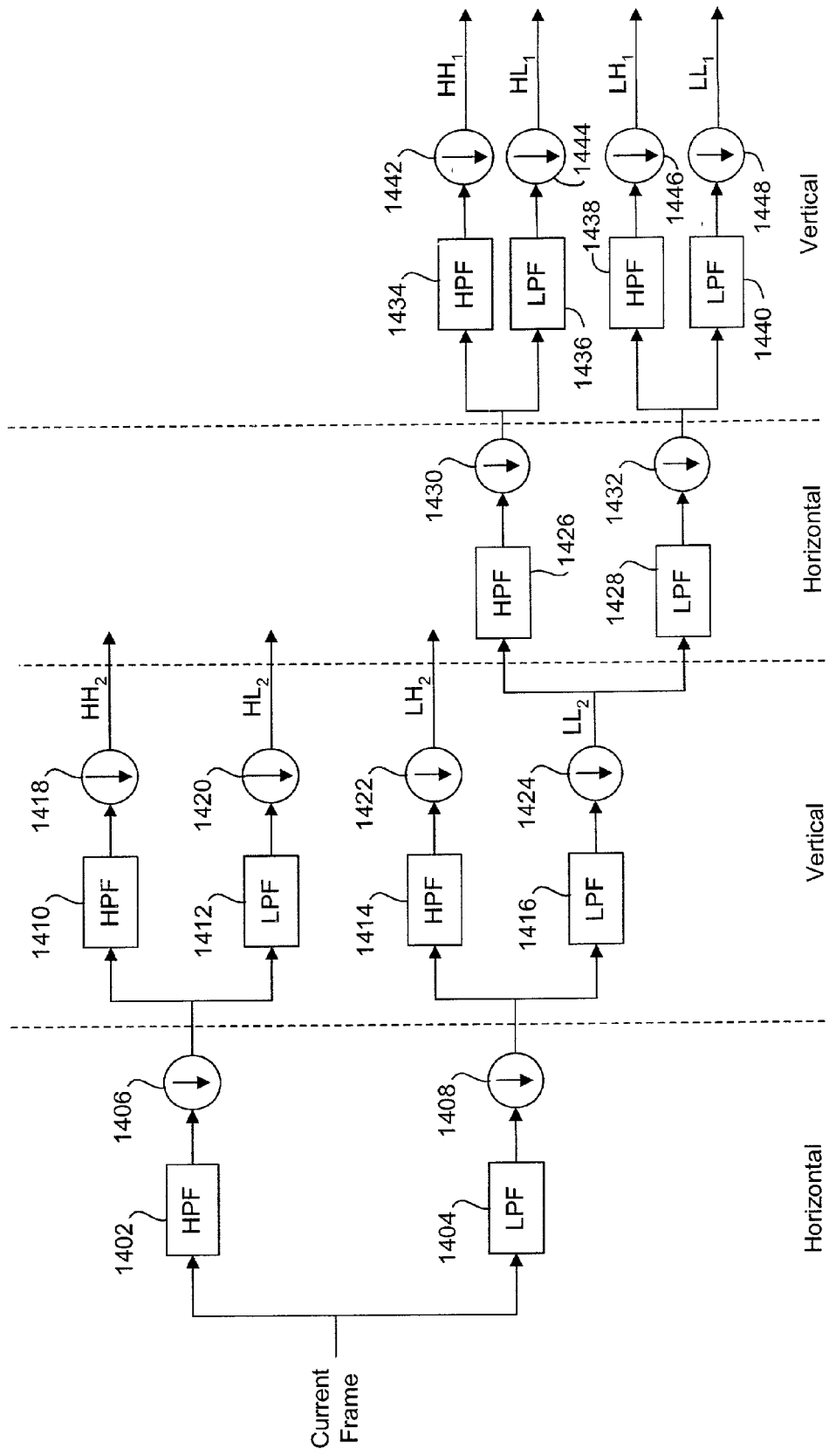
FIG. 14 is a block diagram of logical components of a wavelet transform unit.

FIG. 14 is a block diagram of logical components of a WTU 1002 in accordance with the embodiments disclosed herein. The current frame is input to a high-pass filter (HPF) 1402 and a low-pass filter (LPF) 1404. The HPF 1402 and LPF 1404 operate on the current frame in a horizontal direction, i.e., pixel values adjacent to one another in a horizontal direction are taken as inputs to the HPF 1402 and LPF 1404. The outputs of the HPF 1402 and the LPF 1404 are down-sampled by a factor of 2 by down-samplers 1406 and 1408.

The output of the down-sampler 1406 is input to HPF 1410 and LPF 1412, while the output of the down-sampler 1408 is input to HPF 1414 and LPF 1416. HPFs 1410 and 1414 and LPFs 1412 and 1416 operate in a vertical direction, i.e., outputs from the HPF 1402 and the LPF 1404 that are adjacent to one another in a vertical direction are taken as inputs. The outputs of the HPFs 1410 and 1414 and LPFs 1412 and 1416 are again down-sampled by a factor of 2 by down-samplers 1418, 1420, 1422, and 1424. At this point, the current frame has been broken down into 4 frequency subbands: LL2, LH2, HL2, and HH2.

The above procedure is then repeated on the LL2 subband. In particular, the LL2 subband is input to the HPF 1426 and the LPF 1428, which operate on the LL2 subband in a horizontal direction. The outputs of these filters are down-sampled by a factor of 2 by down-samplers 1430 and 1432. The output of the down-sampler 1430 is input to HPF 1434 and LPF 1436, while the output of the down-sampler 1432 is input to HPF 1438 and LPF 1440. The outputs of the HPFs 1434 and 1438 and LPFs 1436 and 1440 are again down-sampled by a factor of 2 by down-samplers 1442, 1444, 1446, and 1448. This creates 4 additional frequency subbands: LL1, LH1, HL1, and HH1.

Additional details about the WTU 1002 will be readily apparent to those skilled in the art. Reference is made to chapter 7.4 of Compressed Video Over Networks, by Ming-Ting Sun and Amy R. Reibman, entitled Layered Coding With Wavelets. This chapter is hereby incorporated by reference in its entirety.

Figure 15:
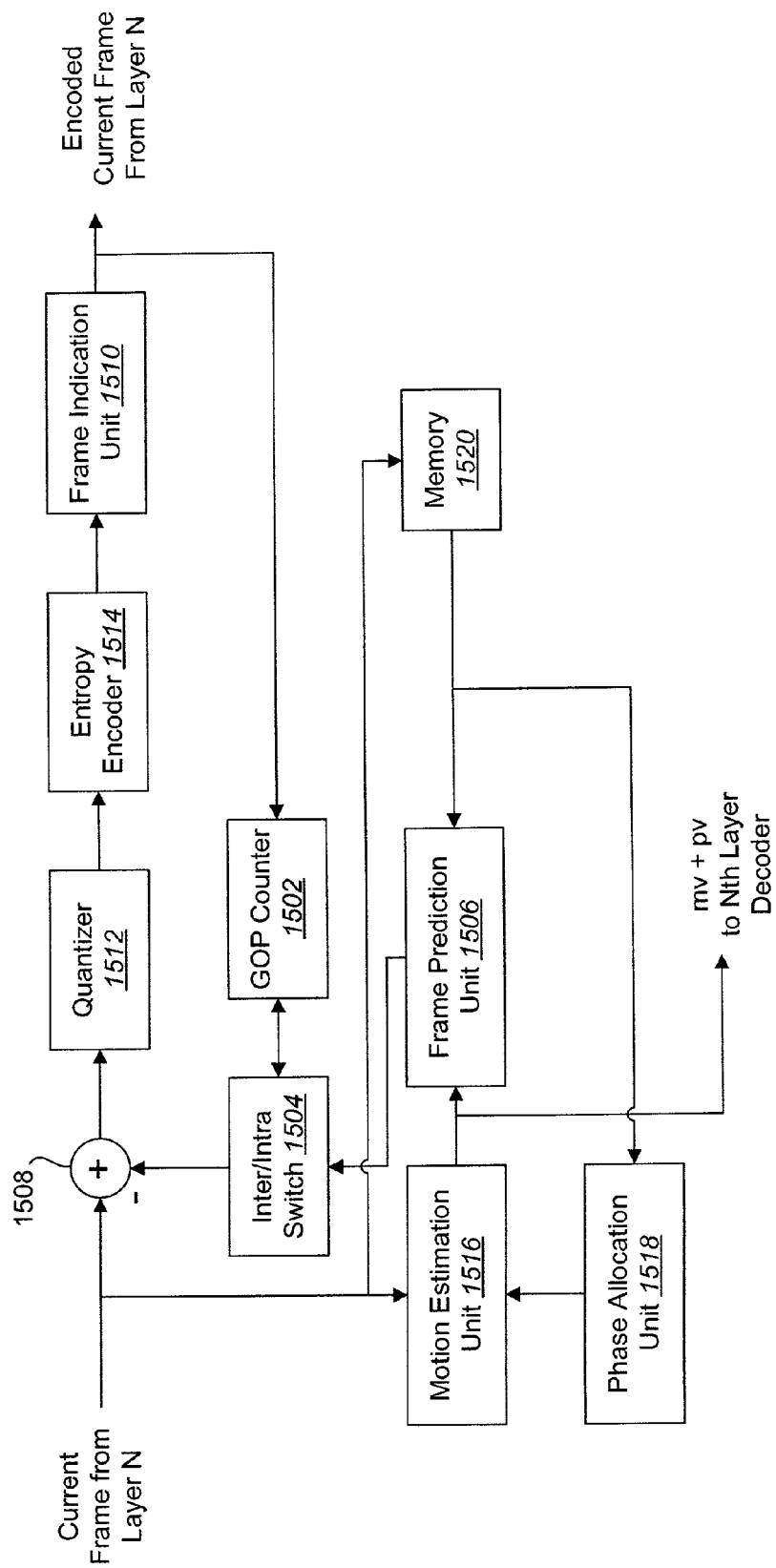
FIG. 15 shows a block diagram of logical components of an Nth layer encoder that may be used in embodiments where the scaling unit is a wavelet transform unit.

FIG. 15 shows a block diagram of logical components of an Nth layer encoder 1510 that may be used in embodiments where the scaling unit 1002 is a WTU 1002. The Nth layer of a current frame is input to the Nth layer encoder 1510. The current frame is capable of being encoded as an I frame or a P frame. As noted previously, a GOP is defined for each layer. Each time a frame is encoded, the GOP counter 1502 increments. If the previous frame completed a GOP, the inter/intra switch 1504 is kept out of position to connect the frame prediction unit 1506 to the adder/subtractor 1508, and the current frame will be encoded as an I frame. The GOP counter 1502 then resets to 0. If the previous frame did not complete a GOP, the inter/intra switch 1504 is put in position to connect the frame prediction unit 1506 to the adder/subtractor 1508, and the current frame will be encoded as a P frame. The frame indication unit 1510 adds a flag to the encoded layer that will enable the scalable decoder 116 to determine whether the current frame is an I frame or a P frame.

If the current frame is to be encoded as an I frame, the Nth layer encoder 1510 functions as follows. The current frame is quantized by the quantizer 1512, entropy encoded by the entropy encoder 1514, and transmitted to the scalable decoder 116. Quantization refers to the process of assigning the pixel values of the current frame to one of a plurality of discrete levels. Entropy coding refers to the process of shortening runs of identical pixel values. Operation of the quantizer 1512 and entropy encoder 1514 are well known by those skilled in the art.

If the current frame is to be encoded as a P frame, the Nth layer encoder 1510 functions as follows. The current frame is simultaneously input to the adder/subtractor 1508 and to the motion estimation unit 1516. The previous frame is retrieved from the memory 1520 and sent to the phase allocation unit 1518. The phase allocation unit 1518 performs an over-complete phase expansion of the previous frame, as described in detail in copending application Ser. No. 09/877,463 entitled "Wavelet Domain Motion Compensation System," assigned to the assignee of the present invention. This copending application is hereby incorporated by reference in its entirety.

Essentially, the phase allocation unit 1518 creates 4 "phase allocated" versions of the previous frame by shifting the indices of the previous frame in various directions relative to one another. The purpose of this step is to compensate for any error introduced by the down-sampling in the WTU 1002. The motion estimation unit 1516 then compares the pixel values from the current frame to the phase allocated versions of the previous frame on a block-by-block basis, searching for the best possible match. When the best match is found, a motion vector is generated which represents movement of the block of coefficients from the previous frame to the current frame. A phase vector is also generated which represents which of the phase-allocated versions of the previous frame contains the best match with the selected block from the current frame. Several motion vectors and phase vectors may be generated for each frame, each motion vector and phase vector pair corresponding to a block of pixel values. The motion vectors and the phase vectors are sent to the frame prediction unit 1506 and to the scalable decoder 116.

The frame prediction unit 1506 also receives the previous frame from the memory 1520. The frame prediction unit 1506 then generates a prediction of the current frame based on the previous frame and the corresponding motion vectors and phase vectors. This predicted version of the current frame is sent to the adder/subtractor 1508, where it is subtracted from the actual version of the current frame. Thus, only the differences between the current frame and the predicted version of the current frame are quantized by the quantizer 1512, entropy encoded by the entropy encoder 1514, and transmitted to the scalable decoder 116.

Figure 16:
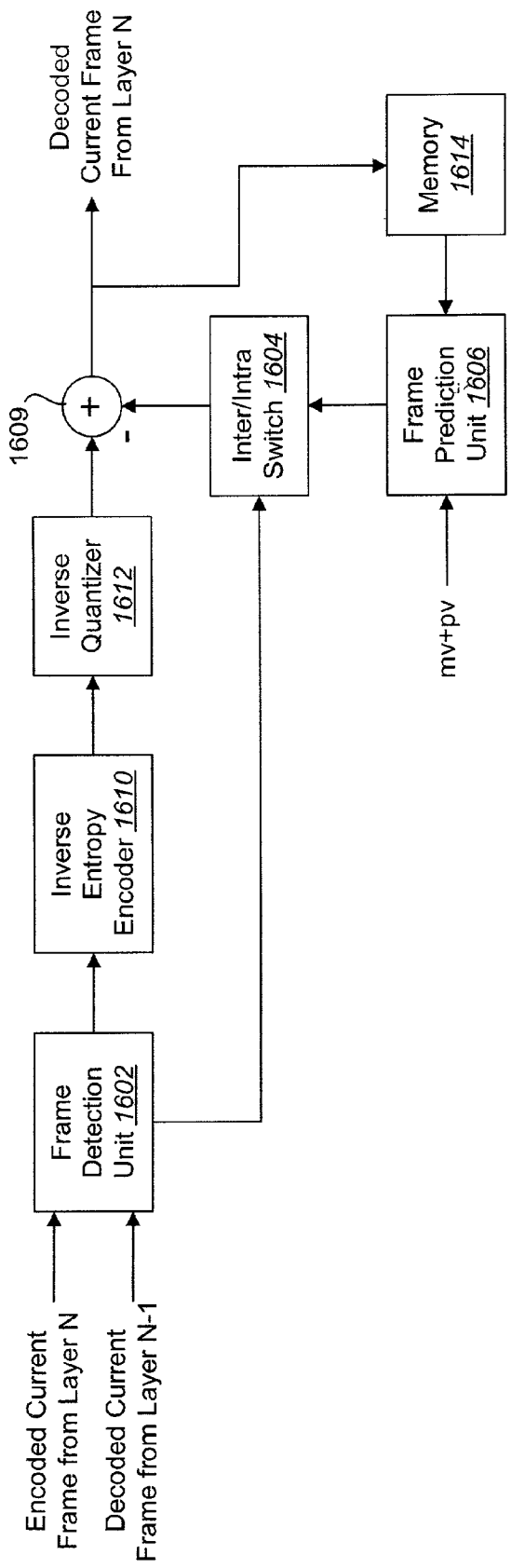
FIG. 16 shows a block diagram of logical components of an Nth layer decoder that may be used in embodiments where the scaling unit is a wavelet transform unit.

FIG. 16 shows a block diagram of logical components of an Nth layer decoder 1608 that may be used in embodiments where the scaling unit 1002 is a WTU 1002. The Nth layer decoder 1608 receives as input an encoded current frame from a particular layer, and any corresponding information (e.g., motion vectors and a phase vectors). For values of N not equal to 1, the Nth layer decoder 1608 also receives the decoded current frame from the (N−1)st layer. The layer decoder 1608 is capable of decoding I frames or P frames.

The frame detection unit 1602 determines whether the current frame is an I frame or a P frame. If the current frame is an I frame, then the Nth layer decoder 1608 operates as follows. The inter/intra switch 1604 does not connect the frame prediction unit 1606 to the adder/subtractor 1609. The encoded current frame is inverse entropy encoded by the inverse entropy encoder 1610 and inverse quantized by the inverse quantizer 1612 in a known manner. The output of the inverse quantizer 1612 is stored in the memory 1614 and output to the display unit 118.

If the current frame is an P frame, then the Nth layer decoder 1608 operates as follows. The inter/intra switch 1604 connects the frame prediction unit 1606 to the adder/subtractor 1609. The encoded current frame is inverse entropy encoded by the inverse entropy encoder 1610 and inverse quantized by the inverse quantizer 1612 in a known manner. The motion vector and the phase vector are input to the frame prediction unit 1606. The previous frame is also input to the frame prediction unit 1606 from the memory 1614. The frame prediction unit 1606 generates a predicted version of the current frame from the previous frame and the corresponding motion vectors and phase vectors. The encoded current frame consists of the differences between the predicted version of the current frame and the actual current frame. These differences are subtracted from the predicted version of the current frame by the adder/subtractor 1609. The output of the adder/subtractor 1609 is stored in the memory 1614 and output to the display unit 118.

Those of skill in the art would understand that information and signals described herein may be represented using any of a variety of different technologies and techniques. For example, data, instructions, commands, information, and signals that may be referenced throughout the above description may be represented by voltages, currents, electromagnetic waves, magnetic fields or particles, optical fields or particles, or any combination thereof.

Those of skill in the art would also understand that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method in video transmission unit for reducing the average latency associated with randomly accessing an encoded digital video signal, the method comprising:
   converting a digital video signal into multiple layers;
   encoding successive layers of the digital video signal at an increasing degree of quality and a decreasing intra-frame rate;
   transmitting the multiple layers to one or more video reception units; and
   transmitting information to the one or more video reception units which enables the one or more video reception units to, for each frame of the digital video signal in which a highest decodable layer is different than a highest layer of the multiple layers, identify the highest decodable layer, decode the highest decodable layer, and display the highest decodable layer.

2. The method of claim 1, wherein the degree of quality comprises a spatial resolution.

3. The method of claim 1, wherein the degree of quality comprises a signal-to-noise ratio.

4. The method of claim 1, wherein the intra-frame rate of a first layer of the digital video signal is 1.

5. The method of claim 1, wherein a first layer of the digital video signal comprises frequency components of the digital video signal below a first frequency, and wherein a second layer of the digital video signal comprises frequency components of the digital video signal below a second frequency that is higher than the first frequency.

6. The method of claim 1, wherein converting the digital video signal into the multiple layers is performed according to a video compression/decompression standard selected from the group consisting of: MPEG-2, MPEG-4, and H.263+.

7. A method in a video reception unit for reducing the average latency associated with randomly accessing an encoded digital video signal, the method comprising:
   receiving a digital video signal;
   accessing multiple layers of the digital video signal, wherein successive layers are encoded at an increasing degree of quality and a decreasing intra-frame rate; and
   for each frame of the digital video signal in which a highest decodable layer is different than a highest layer of the multiple layers, identifying the highest decodable layer, decoding the highest decodable layer, and displaying the highest decodable layer.

8. The method of claim 7, wherein the degree of quality comprises a spatial resolution.

9. The method of claim 7, wherein the degree of quality comprises a signal-to-noise ratio.

10. The method of claim 7, wherein the intra-frame rate of a first layer of the digital video signal is 1.

11. The method of claim 7, wherein a first layer of the digital video signal comprises frequency components of the digital video signal below a first frequency, and wherein a second layer of the digital video signal comprises frequency components of the digital video signal below a second frequency that is higher than the first frequency.

12. The method of claim 7, wherein the multiple layers are created according to a video compression/decompression standard selected from the group consisting of: MPEG-2, MPEG-4, and H.263+.

13. A video transmission unit that is configured to reduce the average latency associated with randomly accessing an encoded digital video signal, the video transmission unit comprising:
   a processor;
   memory in electronic communication with the processor;
   instructions stored in the memory, the instructions being executable to implement a method comprising:
      converting a digital video signal into multiple layers;
      encoding successive layers of the digital video signal at an increasing degree of quality and a decreasing intra-frame rate;
      transmitting the multiple layers to one or more video reception units; and
      transmitting information to the one or more video reception units which enables the one or more video reception units to, for each frame of the digital video signal in which a highest decodable layer is different than a highest layer of the multiple layers, identify the highest decodable layer, decode the highest decodable layer, and display the highest decodable layer.

14. The video transmission unit of claim 13, wherein the degree of quality comprises a spatial resolution.

15. The video transmission unit of claim 14, wherein the degree of quality comprises a signal-to-noise ratio.

16. The video transmission unit of claim 14, wherein the intra-frame rate of a first layer of the digital video signal is 1.

17. The video transmission unit of claim 14, wherein a first layer of the digital video signal comprises frequency components of the digital video signal below a first frequency, and wherein a second layer of the digital video signal comprises frequency components of the digital video signal below a second frequency that is higher than the first frequency.

18. The video transmission unit of claim 14, wherein converting the digital video signal into the multiple layers is performed according to a video compression/decompression standard selected from the group consisting of: MPEG-2, MPEG-4, and H.263+.

19. A video reception unit that is configured to reduce the average latency associated with randomly accessing an encoded digital video signal, the video reception unit comprising:
   a processor;
   memory in electronic communication with the processor;
   instructions stored in the memory, the instructions being executable to implement a method comprising:
      receiving a digital video signal;
      accessing multiple layers of the digital video signal, wherein successive layers are encoded at an increasing degree of quality and a decreasing intra-frame rate; and
      for each frame of the digital video signal in which a highest decodable layer is different than a highest layer of the multiple layers, identifying the highest decodable layer, decoding the highest decodable layer, and displaying the highest decodable layer.

20. The video reception unit of claim 19, wherein the degree of quality comprises a spatial resolution.

21. The video reception unit of claim 19, wherein the degree of quality comprises a signal-to-noise ratio.

22. The video reception unit of claim 19, wherein the intra-frame rate of a first layer of the digital video signal is 1.

23. The scalable decoder video reception unit of claim 19, wherein a first layer of the digital video signal comprises frequency components of the digital video signal below a first frequency, and wherein a second layer of the digital video signal comprises frequency components of the digital video signal below a second frequency that is higher than the first frequency.

24. The video reception unit of claim 19, wherein the multiple layers are created according to a video compression/decompression standard selected from the group consisting of: MPEG-2, MPEG-4, and H.263+.

* * * * *

UNITED STATES PATENT AND TRADEMARK OFFICE
CERTIFICATE OF CORRECTION

| | |
|---|---|
| PATENT NO. | : 7,010,043 B2 |
| APPLICATION NO. | : 10/127742 |
| DATED | : March 7, 2006 |
| INVENTOR(S) | : Louis J. Kerofsky et al. |

It is certified that error appears in the above-identified patent and that said Letters Patent is hereby corrected as shown below:

In column 3, line 64, please replace "by dear the" with --by the--.
In column 6, line 11, please replace "be 26 discussed" with --be discussed--.
In column 15, line 52, please replace "in video" with --in a video--.
In column 18, line 17, please replace "scalable decoder video" with --video--.

Signed and Sealed this

Twenty-ninth Day of August, 2006

JON W. DUDAS
*Director of the United States Patent and Trademark Office*